US012709057B2

(12) United States Patent
Kim et al.

(10) Patent No.: US 12,709,057 B2
(45) Date of Patent: Aug. 18, 2026

(54) CONTINUOUS FIBER REINFORCED THERMOPLASTIC RESIN COMPOSITE MATERIAL AND METHOD FOR PRODUCING SAME

(71) Applicant: LOTTE CHEMICAL CORPORATION, Seoul (KR)

(72) Inventors: Won Seock Kim, Daejeon (KR); Jong Wook Lee, Daejeon (KR); You Jung Lee, Daejeon (KR)

(73) Assignee: Lotte Chemical Corporation, Seoul (KR)

( * ) Notice: Subject to any disclaimer, the term of this patent is extended or adjusted under 35 U.S.C. 154(b) by 693 days.

(21) Appl. No.: 18/133,663

(22) Filed: Apr. 12, 2023

(65) Prior Publication Data

US 2023/0241837 A1 Aug. 3, 2023

Related U.S. Application Data

(62) Division of application No. 16/768,139, filed as application No. PCT/KR2018/015006 on Nov. 29, 2018, now abandoned.

(30) Foreign Application Priority Data

Nov. 29, 2017 (KR) ........................ 10-2017-0161580

(51) Int. Cl.
*B33Y 10/00* (2015.01)
*B29C 64/165* (2017.01)
(Continued)

(52) U.S. Cl.
CPC .......... *B29C 64/165* (2017.08); *B29C 64/209* (2017.08); *B29C 64/321* (2017.08);
(Continued)

(58) Field of Classification Search
None
See application file for complete search history.

(56) References Cited

U.S. PATENT DOCUMENTS 3,946,097 A * 3/1976 Takahashi ............ B29C 48/022 264/102
4,814,133 A * 3/1989 Kitagawa ............ G02B 6/4407 264/1.28
(Continued)

FOREIGN PATENT DOCUMENTS

JP 05-278126 A 10/1993
JP 09-78998 A 3/1997
(Continued)

OTHER PUBLICATIONS

Machine translation of KR 20120022360 A, Google Patents. (Year: 2025).*
(Continued)

*Primary Examiner* — Emmanuel S Luk
(74) *Attorney, Agent, or Firm* — Additon, Pendleton & Witherspoon, P.A.

(57) ABSTRACT

Disclosed is a scheme whereby a continuous fiber reinforced thermoplastic resin composite material applicable to production of a reinforcing material of various thermoplastic injection products and manufacture of a fiber reinforced thermoplastic plastic part using 3D printing can be produced by a simple method to have an excellent mechanical property. The present invention provides a continuous fiber reinforced thermoplastic composite material in which a plurality of yarns or tape intermediate materials are combined together to form a rod shape, and a method for producing the same.

13 Claims, 8 Drawing Sheets

(51) Int. Cl.

| | |
|---|---|
| ***B29C 64/209*** | (2017.01) |
| ***B29C 64/321*** | (2017.01) |
| ***B29C 70/52*** | (2006.01) |
| ***B32B 5/26*** | (2006.01) |
| ***B33Y 30/00*** | (2015.01) |
| ***B33Y 70/10*** | (2020.01) |
| *B29K 101/12* | (2006.01) |
| *B29K 307/04* | (2006.01) |
| *B29K 309/08* | (2006.01) |

(52) U.S. Cl.

CPC ................ *B29C 70/52* (2013.01); *B32B 5/26* (2013.01); *B33Y 10/00* (2014.12); *B33Y 30/00* (2014.12); *B33Y 70/10* (2020.01); *B29K 2101/12* (2013.01); *B29K 2307/04* (2013.01); *B29K 2309/08* (2013.01); *B32B 2260/023* (2013.01); *B32B 2260/046* (2013.01); *B32B 2262/101* (2013.01); *B32B 2262/106* (2013.01)

(56) References Cited

U.S. PATENT DOCUMENTS

| | | | | |
|---|---|---|---|---|
| 4,976,906 | A * | 12/1990 | Nakasone | B29C 70/521<br>264/237 |
| 5,026,447 | A * | 6/1991 | O'Connor | B29C 70/52<br>264/296 |
| 5,073,413 | A * | 12/1991 | Koppernaes | B29B 15/122<br>427/294 |
| 5,084,222 | A | 1/1992 | Glemet et al. | |
| 7,703,906 | B2 | 4/2010 | Jones et al. | |
| 11,147,306 | B2 * | 10/2021 | Caprini | A24D 3/17 |
| 2001/0048175 | A1 | 12/2001 | Edwards et al. | |
| 2004/0238999 | A1 | 12/2004 | Mulligan et al. | |
| 2005/0260379 | A1 * | 11/2005 | Verhaeghe | B29C 70/24<br>428/95 |
| 2012/0071586 | A1 | 3/2012 | Thunhorst et al. | |
| 2012/0261158 | A1 | 10/2012 | Daniel et al. | |
| 2013/0136891 | A1 | 5/2013 | Nelson et al. | |
| 2013/0167502 | A1 | 7/2013 | Wilson et al. | |
| 2014/0102760 | A1 | 4/2014 | Nelson et al. | |
| 2014/0106166 | A1 | 4/2014 | Nelson et al. | |
| 2015/0194238 | A1 | 7/2015 | Daniel et al. | |
| 2016/0035453 | A1 | 2/2016 | Nelson et al. | |
| 2016/0039153 | A1 | 2/2016 | Thunhorst et al. | |
| 2017/0334155 | A1 * | 11/2017 | Buehler | B29D 99/0003 |
| 2019/0084252 | A1 | 3/2019 | Hochstetter et al. | |
| 2021/0362406 | A1 * | 11/2021 | Kim | C08J 5/042 |

FOREIGN PATENT DOCUMENTS

| | | | |
|---|---|---|---|
| JP | 2014-516822 | A | 7/2014 |
| JP | 2014-517092 | A | 7/2014 |
| KR | 10-0766954 | B1 | 10/2007 |
| KR | 10-2012-0022360 | A | 3/2012 |
| KR | 10-2013-0108352 | A | 10/2013 |
| KR | 10-2014-0015462 | A | 2/2014 |
| KR | 10-2016-0054661 | A | 5/2016 |
| KR | 10-1714772 | A | 3/2017 |

OTHER PUBLICATIONS

Machine translation of KR 20140015462 A, Google Patents. (Year: 2025).*

International Search Report in counterpart International Application No. PCT/KR201/015006 dated Apr. 26, 2019, pp. 1-6.

Matsuzaki et al., "Three-dimensional printing of continuous-fiber composites by in-nozzle impregnation", Scientific Reports, www.nature.com/scientificreports, 6:23058, DOI: 10.1038/srep23058, Mar. 11, 2016, pp. 1-7.

Office Action in counterpart Japanese Application No. 2020-527101 dated Aug. 9, 2022, pp. 1-7.

Ali, Zulfigaqr, "Yarn Manufacturing" Jul. 2016, De Gruyter, Physical Sciences Reviews, vol. 1, Issue 7, p. 1-16 (Year: 2016).

* cited by examiner (A) (B)

CONTINUOUS FIBER REINFORCED THERMOPLASTIC RESIN COMPOSITE MATERIAL AND METHOD FOR PRODUCING SAME

CROSS-REFERENCE TO RELATED APPLICATIONS

This application is a divisional application of U.S. application Ser. No. 16/768,139, pending, which was filed May 29, 2020, in the United States Patent and Trademark Office as a National Stage entry from International Application No. PCT/KR2018/015006, filed Nov. 29, 2018, which published as WO 2019/107991 on Jun. 6, 2019, and claims priority to and the benefit of International Application No. PCT/KR2018/015006 and Korean Patent Application No. 10-2017-0161580, filed in the Korean Intellectual Property Office on Nov. 29, 2017, the entire disclosure of each of which is incorporated herein by reference.

TECHNICAL FIELD

The present invention relates to a continuous fiber reinforced thermoplastic resin composite material and a method for producing the same, and more specifically, to a continuous fiber reinforced thermoplastic resin composite material which can be used as a reinforcing material of a thermoplastic resin injection product and a method for producing the same.

BACKGROUND ART

The continuous fiber reinforced polymer rod has been used for various purposes as a structural reinforcing material. Typically, the continuous fiber reinforced polymer rod has been used as a rebar which is inserted into concrete instead of a steel bar, and recently, has been introduced into an insert injection process and used as a reinforcing insert which is inserted into an injection molded part, thereby improving mechanical properties of various injection parts and reducing weight. In addition, the continuous fiber reinforced polymer rod has been also introduced into 3D printing equipment, and thus, an attempt has been made to manufacture a product having high mechanical properties by adding continuous fiber into a resin and stacking a string or rod-shaped composite material reinforced with the continuous fiber, thereby manufacturing a structure, from the existing method of manufacturing a stacked structure using only a thermoplastic resin.

In general, the most conventional method of manufacturing a continuous fiber reinforced polymer in a rod or string shape is a pultrusion method, in which glass fibers or carbon fibers are impregnated in a molten resin, a drawing force is applied thereto, and the resultant resin is passed through a nozzle, thereby manufacturing a rod having a circular cross section or other various cross sections. The pultrusion is capable of implementing high productivity and excellent quality, but is suitable for mass production and thus requires a large and expensive pultrusion machine and can secure economical production costs only in mass production. Therefore, this process is not suitable for a product group requiring a small quantity batch production.

Korean Patent Laid-open Publication No. 2016-0054661 discloses a uni-directional continuous fiber reinforced thermoplastic composite material characterized by using pre-impregnated thermoplastic composites. In the pre-impregnated composite, thermoplastic resin is impregnated into reinforcing fibers having a continuous fiber reinforced film shape. Rolling the resultant composite to form a circular section rod, and then cutting the rod to a predetermined length. However, the process of rolling a thermoplastic composite material having a thin film shape, which is generally produced by rolling the thermoplastic composite material to form the thermoplastic resin composite material into a rod shape, induces defects in which the film is not rolled but crushed or crumpled, and the reinforcing fiber is broken during the process. In order to solve this problem, a plurality of roll forming machines are required, and a somewhat complicated process is required, for example, an inlet and an outlet of the roll forming machine need to be maintained at a predetermined ratio, and temperatures of the plurality of roll forming machines need to be individually controlled.

Korean Patent No. 0766954 relates to a fiber-reinforced polymer rebar having a self-impregnated protrusion and a manufacturing method thereof, which uses a typical pultrusion process as a method for manufacturing a fiber-reinforced polymer rebar. The above-mentioned patent discloses a technique of manufacturing a rod having a circular cross section by impregnating continuous fibers in a resin and then passing the continuous fibers through a nozzle by applying a drawing force, and winding a second fiber and a third fiber along the outer circumferential surface of a first fiber in order to form protrusions on a surface, but other expensive equipment is required since a process for braiding fibers should be further interlocked in a pultrusion process. The pultrusion machine is a large equipment, which can secure economical product costs only when mass production is maintained, and an added equipment is also a large expensive equipment, which requires great initial investment.

Korean Patent No. 1714772 relates to a 3D object-manufacturing robot for manufacturing a 3D object using a formable plastic material, and although strands, yarns, tows, bundles, bands or tapes are exemplified as the material which is used, there is no mention of any method for a molding process, such as compaction of an input material, and there is no presentation of examples with respect to an actual product application, so that it is impossible to identify whether a quality, which can be used as a reinforcing material for strength, rigidity, uniformity of cross-section and surface, and the like, is implemented.

R. Matsuzak et al. (R. Matsuzak et al., Scientific Reports (Nature), Vol. 6 (2016) 23058) discloses a method of using a continuous fiber reinforced composite material in a 3D printer, which increases the strength and rigidity of a product, but a process, in which a continuous fiber bundle and a resin are separately supplied to be instantaneously impregnated, is used, and the method, in which a supplied thermoplastic resin is dissolved by heating at a nozzle of the 3D printer and instantaneously impregnated in a continuous fiber separately supplied, further includes a impregnating process, and thus there is a problem in that a 3D printer device becomes large and it is difficult to increase the production speed. Since the impregnation state of the thermoplastic resin determines the strength and rigidity of the composite material, it is necessary to maintain an excellent impregnation state by maintaining a high temperature and high pressure state for a long time, and mounting a device for forming a high temperature and high pressure state in the 3D printer device makes it difficult to maintain and use the 3D printer device and achieve fast productivity, increases the unit cost of production, and causes a low quality.

DISCLOSURE OF THE INVENTION

Technical Problem

Accordingly, the present invention has been made to solve the above-mentioned problems, and it is an object of the present invention to provide a scheme which produces a continuous fiber reinforced thermoplastic resin composite material applicable to production of a reinforcing material for various thermoplastic injection products and manufacture of a fiber reinforced thermoplastic plastic part using 3D printing by a simple method so as to have an excellent mechanical property.

Technical Solution

To solve the above problem, the present invention provides a continuous fiber reinforced thermoplastic composite material in which a plurality of yarns or tape intermediate materials are combined together to form a rod shape.

In addition, there is provided a continuous fiber reinforced thermoplastic composite material characterized in that the composite material may have a porosity of 1-10 vol %.

In addition, there is provided a continuous fiber reinforced thermoplastic composite material characterized in that the composite material may satisfy Expression 1 below on the basis of the cross-section of the composite material:

$$0.2\ \text{mm}^{-1} \leq P/A \leq 5\ \text{mm}^{-1} \quad \text{[Expression 1]}$$

In Expression 1, P and A may be a cross-sectional circumference length and a cross-sectional area of the composite material, respectively.

In addition, there is provided a continuous fiber reinforced thermoplastic composite material characterized in that the tape may have a thickness of 0.1-1.0 mm and a width of 3-30 mm.

In addition, there is provided a continuous fiber reinforced thermoplastic composite material characterized in that the combining may be performed by introducing 2-10 yarns or tapes.

In addition, there is provided a continuous fiber reinforced thermoplastic composite material characterized in that the continuous fiber may be a glass fiber or a carbon fiber.

To solve the above another problem, the present invention also provides a method for producing a continuous fiber reinforced thermoplastic resin composite material, the method including the steps of: (a) continuously introducing a plurality of yarns or tape-type intermediate materials into a heating unit; (b) heating the intermediate materials to a temperature equal to or higher than the melting point of a thermoplastic resin contained in the intermediate materials to melt at least a portion of the thermoplastic resin on the surface of the intermediate material; and (c) passing at least two of the molten intermediate materials through a nozzle to be combined together to form a rod shape.

In addition, there is provided a method for producing a continuous fiber reinforced thermoplastic resin composite material characterized in that the intermediate material may have a continuous fiber content of 30-60 wt % and a thermoplastic resin content of 40-70 wt %.

Furthermore, there is provided a method for producing a continuous fiber reinforced thermoplastic resin composite material characterized in that the heating in step (b) may be performed at a temperature higher than the melting point of the thermoplastic resin by 20-40° C.

In addition, there is provided a method for producing a continuous fiber reinforced thermoplastic resin composite material characterized in that the nozzle may have a cross-sectional shape in which a bend is not formed, or one or more recess and protrusion are formed.

Also, there is provided a method for producing a continuous fiber reinforced thermoplastic resin composite material characterized in that the rod discharged through the nozzle may be rotated to form a spiral shape.

Additionally, there is provided a method for producing a continuous fiber reinforced thermoplastic resin composite material characterized in that the nozzle may have a diameter ratio of the inlet end to the diameter of the outlet end of 1.5-5 and a length ratio of the outlet end to the diameter of the outlet end of 2-10.

In addition, there is provided a method for producing a continuous fiber reinforced thermoplastic resin composite material characterized in that the nozzle may be formed in multiple stages and has a reduced diameter toward the outlet.

Advantageous Effects

According to the present invention, provided are a continuous fiber reinforced thermoplastic resin composite material and a method for producing the same, which can achieve high productivity and excellent quality only with a simple combining process without having a pultrusion device and a thermoplastic resin impregnating device by using a process for combining together using a yarn or tape-type intermediate material in which a continuous fiber is impregnated in a thermoplastic resin in advance.

In addition, the method for producing a continuous fiber reinforced thermoplastic resin composite material according to the present invention can allow the continuous fiber reinforced thermoplastic resin composite material to have various sizes and cross-sectional shapes only by the injection amount of combined intermediate materials and the change of a nozzle shape.

MODE FOR CARRYING OUT THE INVENTION

Hereinafter, preferred embodiments of the present invention will be described in detail. In describing the present invention, if a detailed description relating to well-known technology is considered to obscure the subject matter of the present invention, the detailed description may be omitted. Throughout the specification, a part is referred to "include" an element, the part does not exclude other elements but may further include other elements unless otherwise indicated.

The present inventors have made research on a method of making a continuous fiber reinforced thermoplastic resin composite material, which can be applied to the production of reinforcing materials of various thermoplastic injection products and the production of fiber reinforced thermoplastic plastic parts using 3D printing, have excellent mechanical properties with a simple manner. As a result, it was observed that only a simple combining process can achieve high productivity and excellent quality without having a pultrusion machine and a thermoplastic resin impregnating device by using a process for combining together using a yarn or tape-type intermediate material in which a continuous fiber is impregnated in a thermoplastic resin in advance, and the present invention was achieved.

Therefore, the present invention discloses a continuous fiber reinforced thermoplastic composite material in which a plurality of yarns or tape intermediate materials are combined together to form a rod shape.

According to the present invention, the production of the continuous fiber reinforced thermoplastic composite material can be performed by including the steps of: (a) continuously introducing a plurality of yarns or tape-type intermediate materials into a heating unit; (b) heating the intermediate materials to a temperature equal to or higher than the melting point of a thermoplastic resin contained in the intermediate materials to melt at least a portion of the thermoplastic resin on the surface of the intermediate material; and (c) passing at least two of the molten intermediate materials through a nozzle to be combined together to form a rod shape.

Hereinafter, the present invention will be described in detail through a process of producing the continuous fiber reinforced thermoplastic composite material according to the present invention.

Figure 1:
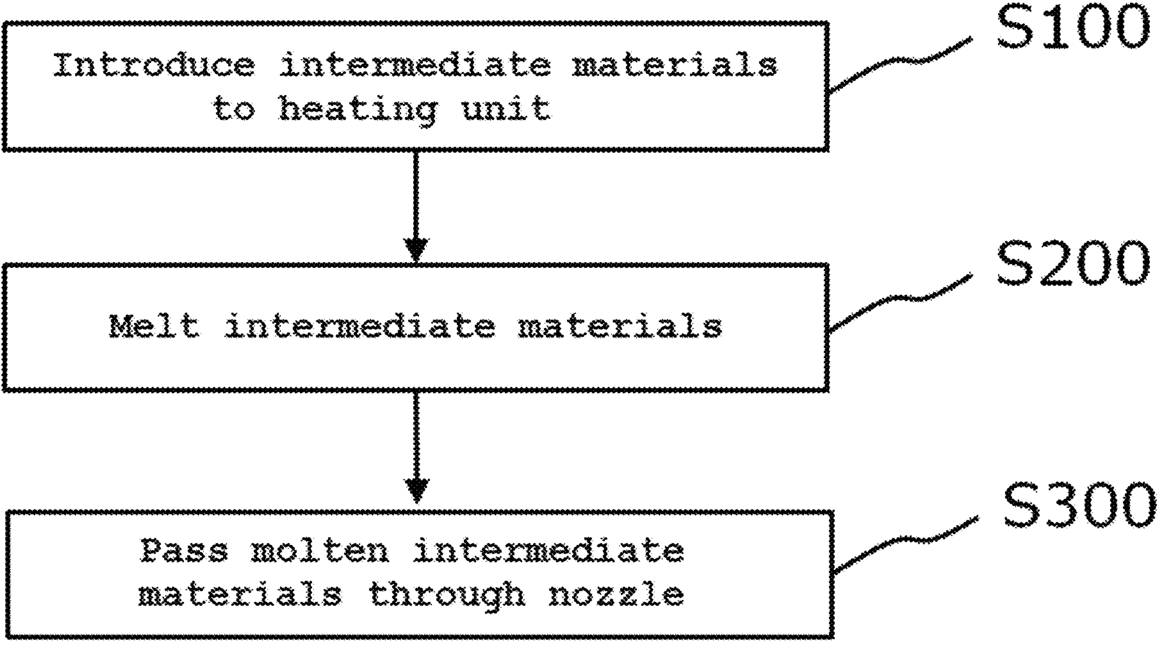
FIGS. 1 and 2 are a flow chart and a schematic diagram, respectively, showing a process of producing a continuous fiber reinforced thermoplastic composite material according to the present invention.
Figure 2:
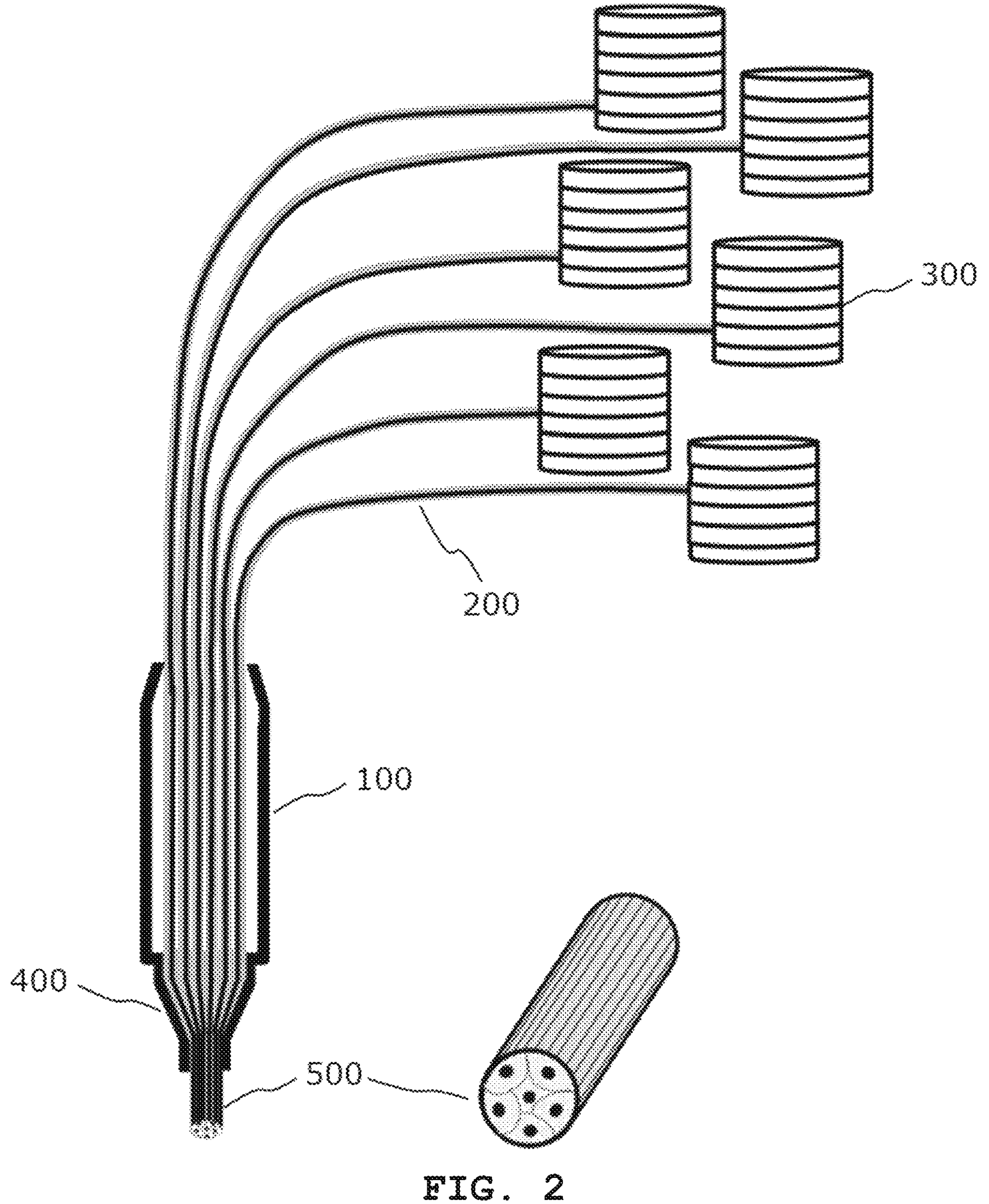

FIGS. 1 and 2 are a flow chart and a schematic diagram, respectively, showing a process of producing the continuous fiber reinforced thermoplastic composite material according to the present invention.

Referring to FIGS. 1 and 2, the method for producing the continuous fiber reinforced thermoplastic composite material according to the present invention, which uses a heating device having a nozzle, includes the steps of: (a) introducing intermediate materials into a heating unit of the heating device (S100); (b) melting the intermediate materials (S200); and (c) passing the melted intermediate materials through the nozzle (S300).

In the present invention, an intermediate material 200, which is introduced into a heating device 100, is a continuous fiber reinforced thermoplastic composite resin, and the thermoplastic resin may include, but is not particularly limited to, for example, a polypropylene resin, a polyethylene terephthalate resin, a polycarbonate resin, a polyamide resin, or the like, and preferably, a polypropylene resin. Therefore, the intermediate material can be beneficial and cost-effective to improve both strength and shock absorption performance. The polypropylene resin may include polypropylene alone or a resin copolymerized with polypropylene and a different kind of monomer, and for example, one selected from the group consisting of a polypropylene homopolymer resin, a propylene-ethylene copolymer resin, a propylene-butene copolymer resin, an ethylene-propylene-butene copolymer resin, and a combination thereof.

In addition, the continuous fiber may be a material conventionally used in the art in producing a fiber-reinforced composite material to improve strength and rigidity of a resin, and preferably may be a glass fiber or a carbon fiber.

The continuous fiber constituting the continuous fiber reinforced thermoplastic resin composite intermediate material 200 means a fiber which is not broken but continuously present therein. For example, like continuous fibers in a unidirectional (UD) sheet, the continuous fibers may be produced by a continuous process. Therefore, the intermediate material may be a continuous fiber reinforced thermoplastic resin composite intermediate material produced by continuously supplying continuous fibers to the continuous process.

Figure 3:
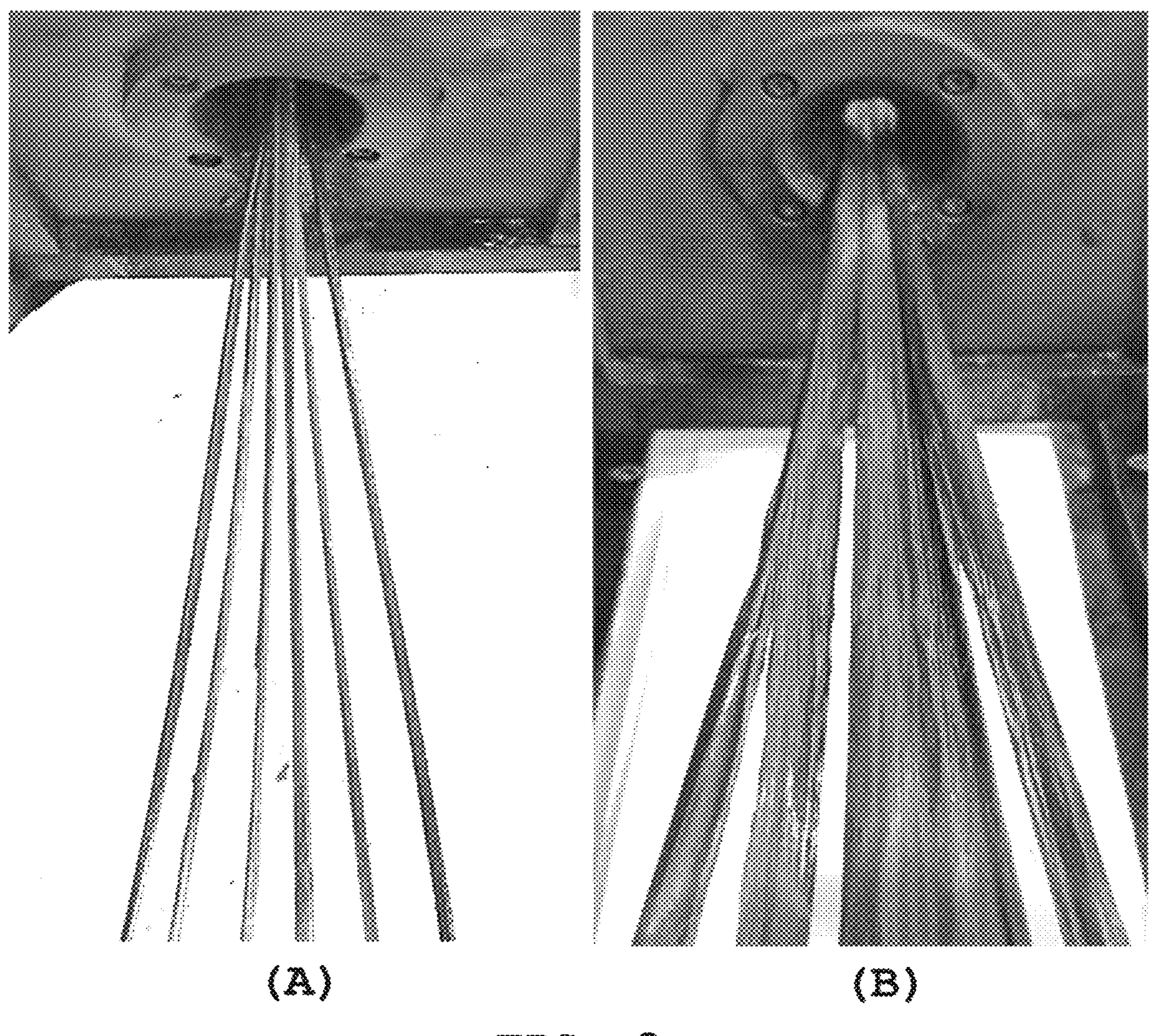
FIG. 3 is a photograph showing a state in which intermediate materials used in the present invention are put into a heating device according to each form of the intermediate materials.

FIG. 3 is a photograph showing a state in which intermediate materials used in the present invention are introduced into the heating device according to each form of the intermediate materials.

Referring to FIG. 3, the intermediate material in the present invention is in the form of a yarn (FIG. 2A) or a tape (FIG. 2B).

The yarn generally means a thermoplastic composite material in the form of a noodle reinforced with continuous fibers in the art of composite materials, and a composite material which is drawn-molded and sold may be generally used. For example, the yarn is an intermediate material produced during the production of the long-fiber composite material (LFT) which is commonly sold in the market of the thermoplastic composite material, and in the present invention, the yarn having a diameter of 1-3 mm may be preferably used.

The tape type is formed by, for example, slitting a composite material in a sheet form, and the present invention may preferably use the tape having a thickness of 0.1-1.0 mm and a width of 3-30 mm, more preferably a thickness of 0.2-0.8 mm and a width of 5-25 mm, even more preferably a thickness of 0.3-0.7 mm and a width of 5-20 mm, and most preferably a thickness of 0.4-0.6 mm and a width of 5-15 mm. When the width of the tape-type intermediate material is too large, the composite material may be crumpled when being introduced into the heating device or the fiber may be broken during the process.

In the present invention, a pultrusion device and a thermoplastic resin impregnating device is not separately provided by using a process for combining together using a yarn or tape-type intermediate material in which the continuous fiber is impregnated in the thermoplastic resin in advance.

Here, 2 to 10 yarns or tapes may be simultaneously introduced into the heating device within the range of the diameter of the yarn or the thickness and width of the tape, preferably 3 to 8 yarns or tapes, and more preferably 3 to 6 yarns or tapes. As the injection amount (the number of yarns or tapes) of the intermediate material which is combined together increases, the flexural strength tends to decrease, and the combining efficiency may decrease, however, in the present invention, as a result of an experiment to be described below, it was confirmed that a glass fiber-reinforced polypropylene rod, in which 3 to 6 intermediate materials are introduced and combined together, exhibits a high flexural strength of 300 MPa or more within the injection amount range, and thus can be sufficiently used as a rebar for a structure.

Meanwhile, the intermediate material 200 may be formed with a content ratio of a continuous fiber of 30-60 wt % and a thermoplastic resin of 40-70 wt %. When the content of the continuous fiber does not reach a predetermined range, it may be difficult to achieve a rigidity reinforcing effect, and when the content is excessive, viscosity of the resin may increase during a process of combining and nozzle-discharging, and thus molding may be difficult.

The yarn or tape-type intermediate material 200 may be continuously unwound from a plurality of bobbin reels 300 while being wound around the plurality of bobbin creels 300 so that the yarn or tape-type intermediate material 200 may be introduced into the heating unit of the heating device 100 without being entangled.

The intermediate material 200 introduced into the heating unit of the heating device 100 is heated and melted in the heating unit. That is, the intermediate material 200 is heated to a temperature equal to or higher than the melting point of the thermoplastic resin contained in the intermediate material 200 to melt at least a portion of the thermoplastic resin on the surface of the intermediate material 200, and thus several intermediate materials 200 are pre-combined together.

At this time, the temperature of the heating unit 100 may be set to be equal to or higher than the melting point of the thermoplastic resin constituting the intermediate material 200, but may be preferably 20-40° C. higher than the melting point of the thermoplastic resin. For example, when the thermoplastic resin is a polypropylene resin having a melting point of 160° C., the temperature of the heating unit 100 may be set to 180-220° C. When the temperature of the heating unit 100 is set to be less than or too close to the melting point, the thermoplastic resin on the surface of the composite material may be introduced into the nozzle without being completely melted, and thus the combining performance may be deteriorated and the mechanical properties may be deteriorated, and when the temperature of the heating unit 100 is set to be too high, the effect of increasing the mechanical properties may not be great as compared to increasing the process cost.

The heating source of the heating unit 100 may include, but is not particularly limited to, for example, a halogen lamp, a hot air heater, and a laser heater.

The intermediate materials, which are melted in the heating unit 100 and pre-combined, pass through the nozzle 400 to be finally combined together to form a rod shape. That is, the intermediate materials, in which the thermoplastic resins at least on the surface of the intermediate materials are melted while passing through the heating unit 100, are introduced into the nozzle 400, and are combined together by being pressured while the cross-sectional area of the inside of the nozzle is getting smaller than that of the heating unit, thereby forming a rod shape.

A material of the nozzle 400 may include, but is not particularly limited to, for example, a phosphor bronze material containing 0.05-0.5 wt % of phosphorus (P), which is processed and has excellent heat resistance, corrosion resistance, and abrasion resistance (hardness of 100 HB or more). In addition, the nozzle may be used in which the inner surface of the nozzle 400 may be polished to be precisely refined to an average surface roughness Ra of 1 μm or less, and in this case, when the composite material passing through the nozzle 400 is compressed inside the nozzle 400, damage to the material due to friction in slipping between the composite material and the nozzle surface may be minimized.

Figure 4:
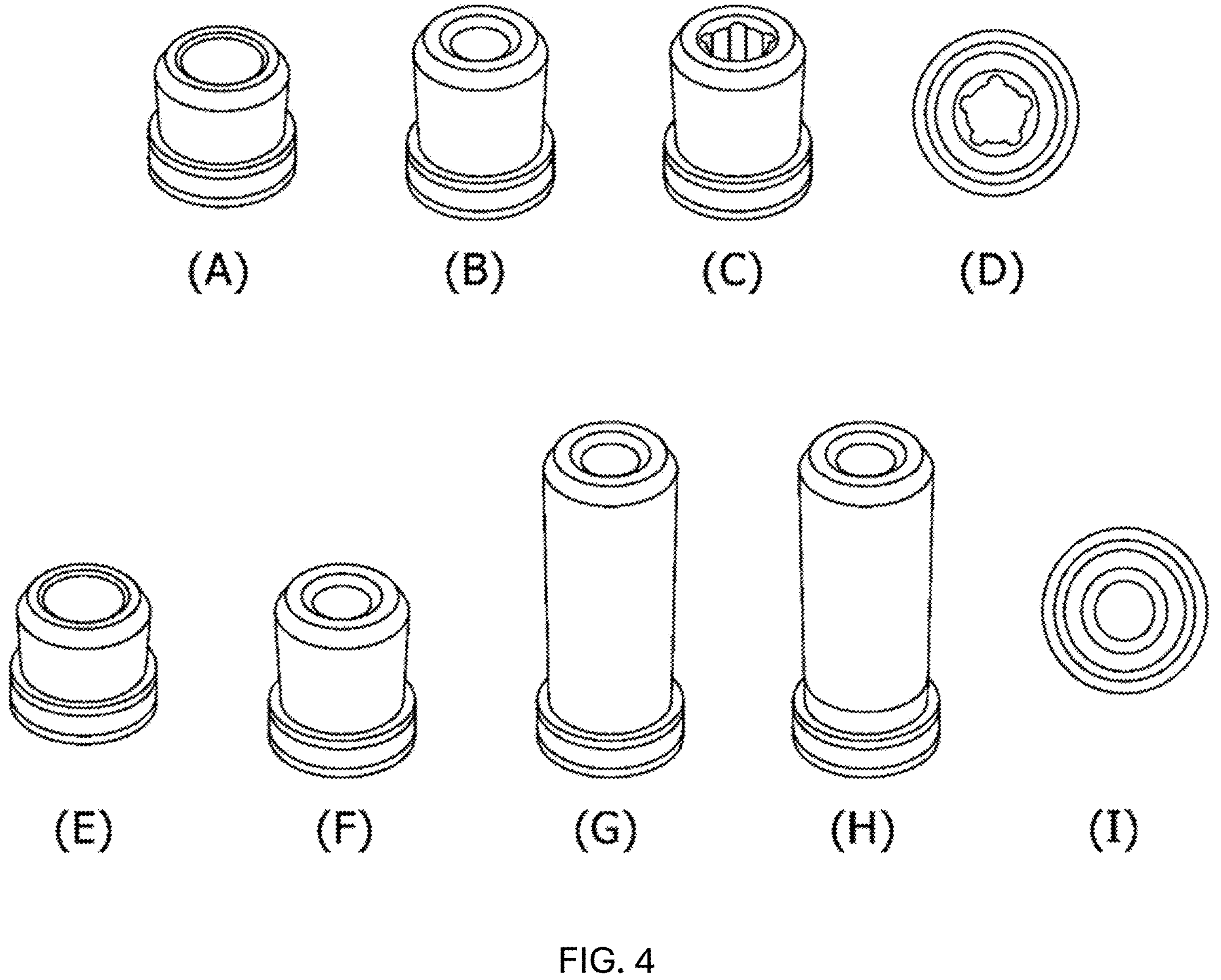
FIG. 4 is a picture illustrating a nozzle having various inner diameter, length and cross-sectional shape in the present invention.

In the present invention, as shown in FIG. 4, the nozzle 400 may be mounted on or detached from the heating device 100, and may be manufactured in various inner diameter, length, and cross-sectional shapes to change the cross-sectional size of the rod-shaped continuous fiber reinforced thermoplastic resin composite material 500 formed according to the injection amount of the intermediate material 200 by applying various outlet diameters. Meanwhile, FIGS. 4D and 4I show a shape in which the inner cross-section of the nozzle becomes narrower from the inlet end to the outlet end.

Figure 5:
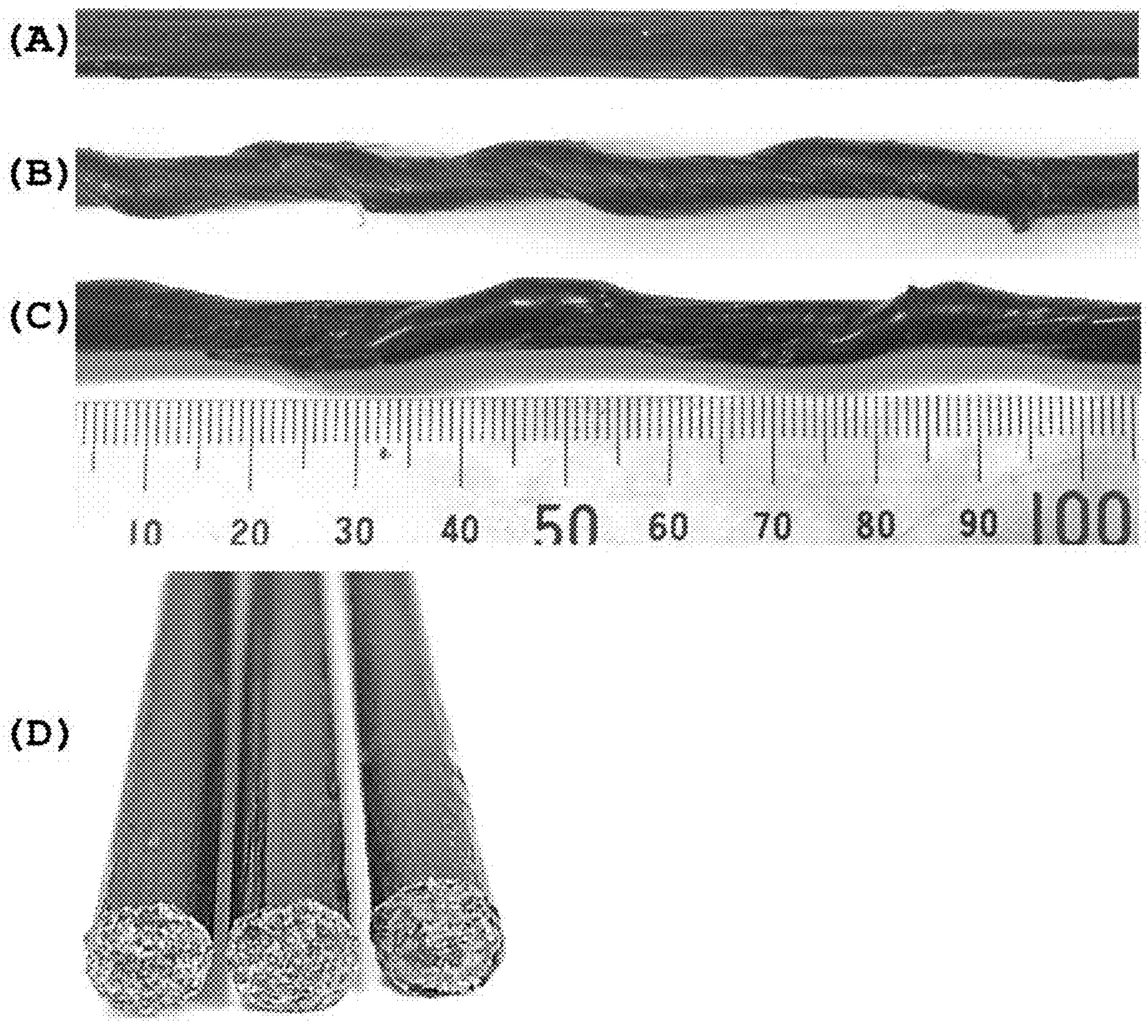
FIG. 5 is a photograph showing various shapes of the continuous fiber reinforced thermoplastic resin composite material prepared according to the present invention.

In addition, when a nozzle, in which recess and protrusion, such as ribs or grooves are formed around the circle, is applied in the nozzle 400, except that the cross-sectional shape of the inner diameter is a simple shape (see FIGS. 5A and 5D) such as a circular shape without a bend, or when the rod is rotated and pulled out, a thread shape or a twist shape may be formed on the surface of the formed rod (see FIGS. 5B and 5C).

The composite material finally produced according to the various shapes of the nozzle 400 may satisfy the following Expression 1 as a cross-sectional reference.

$$0.2\ \mathrm{mm}^{-}\leq P/A\leq 5\ \mathrm{mm}^{-1} \qquad \text{[Expression 1]}$$

In Equation 1, P and A may be a cross-sectional circumference length and a cross-sectional area of the composite material, respectively.

Figure 6:
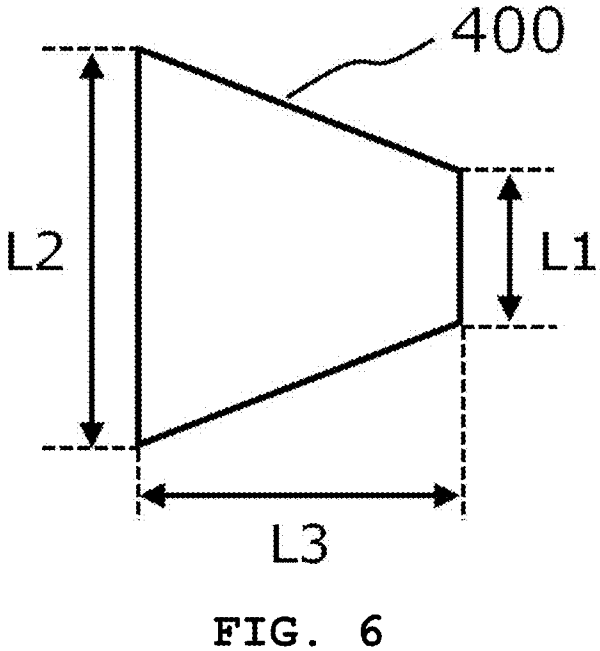
FIG. 6 is a schematic cross-sectional view inside the nozzle according to an embodiment of the present invention.

Meanwhile, in the present invention, the inner cross-section of the nozzle 400 may have a shape which becomes narrower from the inlet end to the outlet end, and considering the combining efficiency of a yarn or tape-type intermediate material according to the present invention, preferably, the ratio of the inlet end diameter (L2) to the outlet end diameter (L1) may be 1.5 to 5 and the ratio of the length (L3) to the outlet end diameter (L1) may be 2 to 10 (see FIG. 6).

Figure 7:
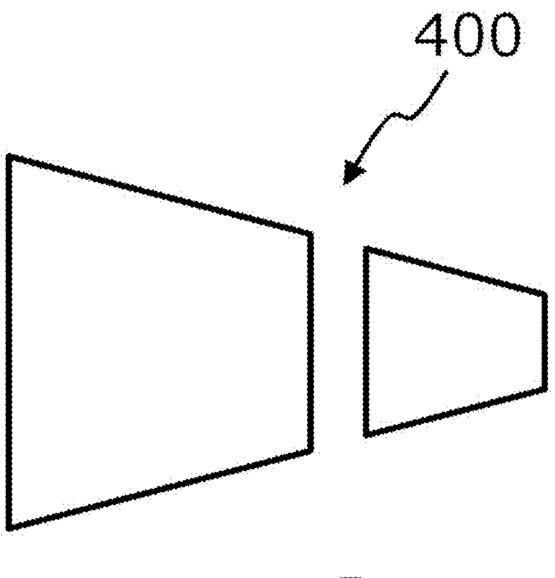
FIG. 7 is a view illustrating a shape of a nozzle according to an embodiment of the present invention.

Meanwhile, a nozzle system may be considered, which may improve a reduction in productivity due to a load caused by compaction of the composite material when passing through the nozzle 400 and a reduction in mechanical properties due to an increase in porosity caused by insufficient compaction. That is, in the present invention, the nozzle 400 is formed in multiple stages and has a diameter reduced toward the outlet, so that the compaction is smoothly performed by controlling the compaction time of the composite material, thereby further improving mechanical properties (see FIG. 7).

The continuous fiber reinforced thermoplastic composite material 500 produced according to the present invention may have a porosity of about 1 vol % to about 10 vol %, preferably about 1 vol % to about 5 vol %. When the continuous fiber reinforced thermoplastic composite material 500 is produced to have a porosity of less than 1 vol %, heating is required at a temperature higher than necessary, which may lead to a reduction in productivity without an additional strength improvement in the finally produced rod-shaped composite material 500. In addition, When the continuous fiber reinforced thermoplastic composite material 500 is produced to have a porosity of more than 10 vol %, productivity may be improved, but it may be difficult to satisfy required mechanical properties.

The continuous fiber reinforced thermoplastic composite material produced according to the present invention can achieve high productivity and excellent quality only with a simple combining process without having a pultrusion device and a thermoplastic resin impregnating device by using a process for combining together using a yarn or tape-type intermediate material employing a nozzle without using a plurality of roll forming machines having a high defect rate in the related art.

In addition, the composite material according to the present invention is produced by a process of combining together using a yarn or tape-type intermediate material in which the continuous fiber is impregnated in the thermoplastic resin in advance, thereby producing a rod-shaped composite material product suitable for various uses such as a material for a rebar and a material for a 3D printer in a product group requiring a small quantity batch production with high productivity and low costs.

Hereinafter, the present invention will be described in more detail with reference to Examples of the present invention.

Example 1

Continuous fiber-reinforced thermoplastic resin composite intermediate materials (glass fiber-reinforced polypropylene, glass fiber content: 50 wt %) were prepared in the form of a yarn (diameter: 1.2 mm), and six intermediate materials were introduced to a heating unit of a heating device (see FIG. 3A), and then were heated to pass through a nozzle to be combined and molded, thereby producing a rod-shaped continuous fiber-reinforced thermoplastic resin composite material (diameter: about 7 mm). The heating unit temperature was set to 180° C. and the production rate was set to 0.5 m/s.

Example 2

A rod-shaped continuous fiber reinforced thermoplastic resin composite material was produced in the same manner as in Example 1 except that the intermediate materials were prepared in the form of a tape (thickness: 0.5 mm, width: 12 mm) and three intermediate materials were introduced to the heating unit of the heating device.

Example 3

A rod-shaped continuous fiber reinforced thermoplastic resin composite material was produced in the same manner as in Example 2 except that four intermediate materials were introduced thereto.

Example 4

A rod-shaped continuous fiber reinforced thermoplastic resin composite material was produced in the same manner as in Example 2 except that five intermediate materials were introduced thereto.

Example 5

A rod-shaped continuous fiber reinforced thermoplastic resin composite material was produced in the same manner as in Example 2 except that six intermediate materials were introduced thereto (see FIG. 3B).

Example 6

A rod-shaped continuous fiber reinforced thermoplastic resin composite material was produced in the same manner as in Example 3 except that the temperature of the heating unit was set to 170° C.

Example 7

A rod-shaped continuous fiber reinforced thermoplastic resin composite material was produced in the same manner as in Example 3 except that the temperature of the heating unit was set to 190° C.

Example 8

A rod-shaped continuous fiber reinforced thermoplastic resin composite material was produced in the same manner as in Example 3 except that the temperature of the heating unit was set to 200° C.

Example 9

A rod-shaped continuous fiber reinforced thermoplastic resin composite material was produced in the same manner as in Example 3 except that the temperature of the heating unit was set to 210° C.

Example 10

A rod-shaped continuous fiber reinforced thermoplastic resin composite material was produced in the same manner as in Example 3 except that the temperature of the heating unit was set to 220° C.

Test Example

Figure 9:
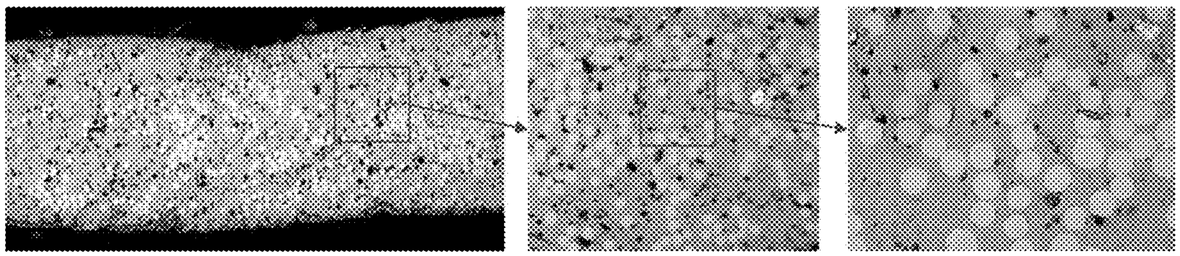
FIGS. 9 and 10 are cross-sectional photographs of the intermediate material and the rod-shaped composite material according to Example 10 of the present invention, respectively.
Figure 10:
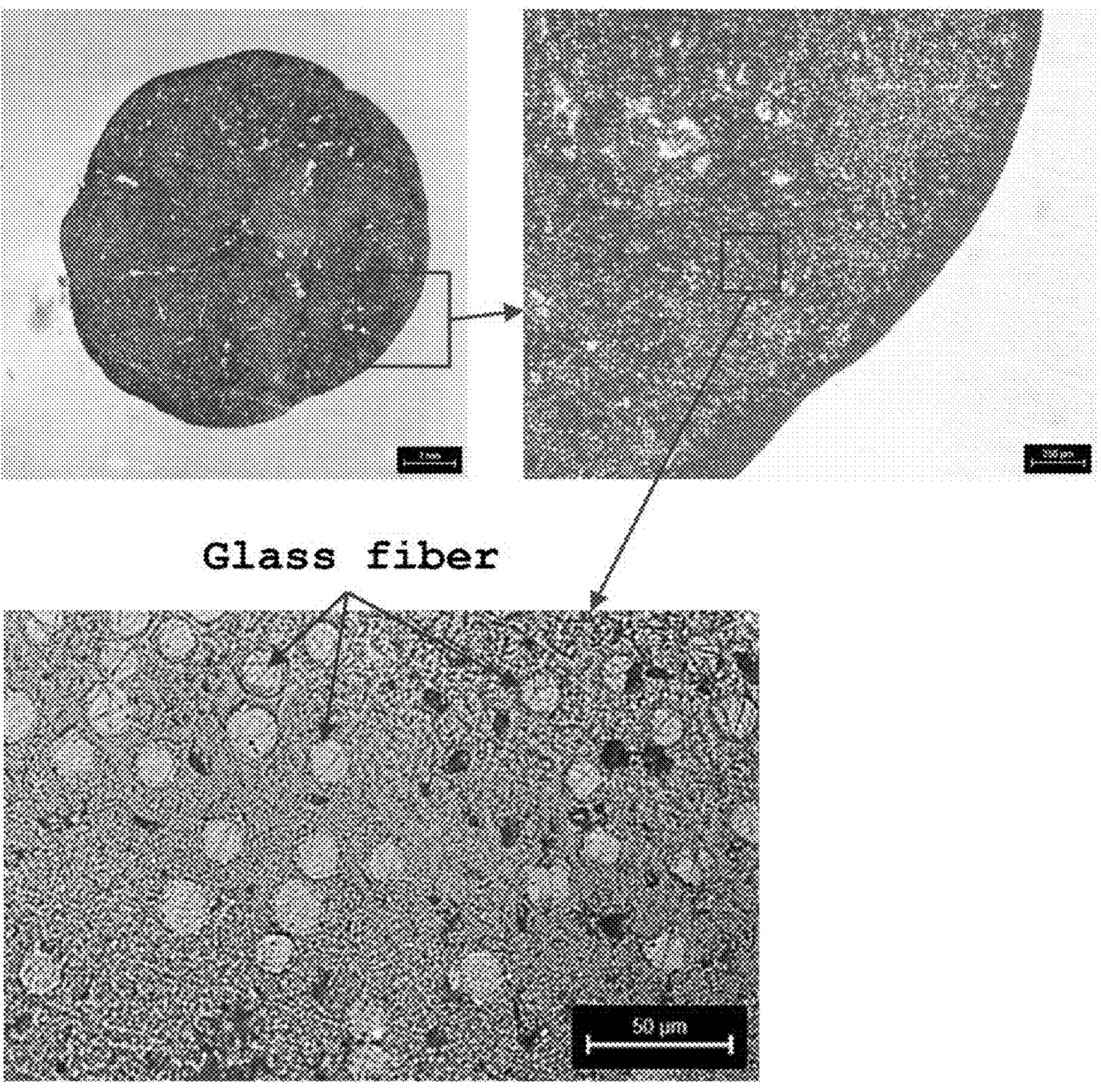

Flexural strength (see FIG. 8) and a porosity of the rod-shaped continuous fiber reinforced thermoplastic resin composite materials produced according to Examples 1 to 10 above were measured according to the following method, and the results are shown in Table 1 below. The cross-sectional photograph of the intermediate material and the cross-sectional photograph of the rod-shaped composite material according to Example 5 are shown in FIGS. 9 and 10, respectively.

[Method of Measuring Flexural Strength]

Figure 8:
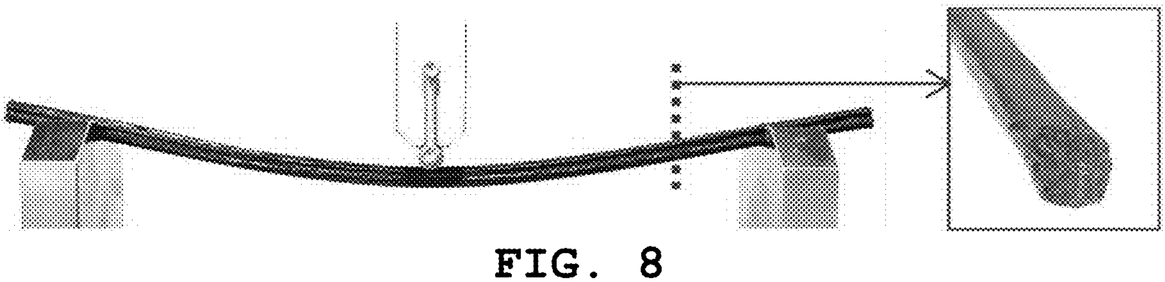
FIG. 8 is a photograph showing a state in which flexural strength is measured in Test Example of the present invention.

The flexural strength was measured in accordance with ASTM D4474 standard, and the maximum load point was measured by applying a three-point bending load to the rod-shaped continuous fiber reinforced thermoplastic resin composite material produced as shown in FIG. 8.

[Method of Measuring Porosity]

A porosity was measured in accordance with ASTM D2734 standard and calculated according to Expression 2 below. The theoretical ideal density of the composite material is compared with the experimentally measured actual density, and thus the porosity is calculated by Expression 2 below. The porosity was calculated as an average value after three or more measurements using different samples.

$$\text{Porosity (\%)} = \left(1 - \frac{\text{Actual density}}{\text{Ideal density}}\right) \times 100 \quad \text{[Expression 2]}$$

TABLE 1

| Division | Intermediate material Form | Number of strands | Heating unit temperature (° C.) | Flexural strength (Mpa) | Porosity (vol %) |
|---|---|---|---|---|---|
| Example 1 | Yarn | 6 | 180 | 415 ± 17 | 2.5 ± 0.1 |
| Example 2 | Tape | 3 | 180 | 376 ± 39 | 3.1 ± 0.7 |
| Example 3 | Tape | 4 | 180 | 362 ± 19 | 4.9 ± 0.3 |
| Example 4 | Tape | 5 | 180 | 337 ± 38 | 4.6 ± 0.6 |
| Example 5 | Tape | 6 | 180 | 312 ± 39 | 4.3 ± 0.5 |
| Example 6 | Tape | 4 | 170 | 278 ± 23 | 5.4 ± 0.9 |
| Example 7 | Tape | 4 | 190 | 358 ± 34 | 4.5 ± 0.7 |
| Example 8 | Tape | 4 | 200 | 373 ± 40 | 3.1 ± 0.1 |

TABLE 1-continued

| Division | Intermediate material Form | Number of strands | Heating unit temperature (° C.) | Flexural strength (Mpa) | Porosity (vol %) |
|---|---|---|---|---|---|
| Example 9 | Tape | 4 | 210 | 365 ± 42 | 4.8 ± 0.7 |
| Example 10 | Tape | 4 | 220 | 386 ± 24 | 3.3 ± 0.1 |

Referring to Table 1, FIG. 9, and FIG. 10, it can be seen that in the case of the composite material produced by combining three to six yarns of an intermediate material having a diameter of about 1.2 mm or three to six tapes of an intermediate material having a thickness of about 0.5 mm and a width of about 12 mm, the composite material showed good porosity of about 5 vol % or less and excellent mechanical properties having a flexural strength of about 300 MPa or more. However, when the temperature of the heating unit is close to the melting point of the thermoplastic resin (see Example 6), the flexural strength is relatively deteriorated, and when the temperature of the heating unit is above a predetermined level, the degree of the flexural strength increase compared to the temperature increase is not large, and thus it can be confirmed that the preferable heating temperature range is present in the combining process according to the present invention.

Hitherto, the preferred examples of the present invention have been described in detail. The description of the present invention is only for illustration, and it could be understood that particular embodiment could be easily changed without changing the technical spirit or essential features of the present invention by one of ordinary skilled in the art.

Accordingly, it should be interpreted that the scope of the present invention is represented by claims hereinafter rather than the detailed description, and all changes or modifications derived from the meaning, range and equivalent concept of claims are included in the scope of the present invention.

What is claimed is:

1. A method for producing a continuous fiber reinforced thermoplastic resin composite material, the method comprising the steps of:

(a) continuously introducing a plurality of yarn intermediate materials having a diameter of 1-3 mm into a heating unit;

(b) heating the intermediate materials to a temperature equal to or higher than the melting point of a thermoplastic resin contained in the intermediate materials to melt at least a portion of the thermoplastic resin on the surface of the intermediate material; and (c) passing at least two of the molten intermediate materials through a nozzle to be combined together to form a rod shape, wherein the composite material has a porosity of 1-10 vol %, and wherein the composite material satisfies Expression 1 below on the basis of the cross-section of the composite material:

$$0.2\ \text{mm}^{-1} \leq P/A \leq 5\ \text{mm}^{-1} \qquad \text{[Expression 1]}$$

wherein, in Expression 1, P and A are a cross-sectional circumference length and a cross-sectional area of the composite material, respectively.

2. The method for producing a continuous fiber reinforced thermoplastic resin composite material of claim 1, wherein the intermediate material has a continuous fiber content of 30-60 wt % and a thermoplastic resin content of 40-70 wt %.

3. The method for producing a continuous fiber reinforced thermoplastic resin composite material of claim 1, wherein the heating in step (b) is performed at a temperature higher than the melting point of the thermoplastic resin by 20-40° C.

4. The method for producing a continuous fiber reinforced thermoplastic resin composite material of claim 1, wherein the nozzle has a cross-sectional shape in which a bend is not formed, or one or more recess and protrusion are formed.

5. The method for producing a continuous fiber reinforced thermoplastic resin composite material of claim 1, wherein the rod discharged through the nozzle is rotated to form a spiral shape.

6. The method for producing a continuous fiber reinforced thermoplastic resin composite material of claim 1, wherein the nozzle has an outlet and wherein the nozzle is formed in multiple stages and has a reduced diameter toward the outlet.

7. The method for producing a continuous fiber reinforced thermoplastic resin composite material of claim 1, wherein the nozzle has an inlet end and an outlet end and wherein the nozzle has a diameter ratio of the inlet end to the diameter of the outlet end of 1.5-5 and a length ratio of the outlet end to the diameter of the outlet end of 2-10.

8. A method for producing a continuous fiber reinforced thermoplastic resin composite material, the method comprising the steps of:

(a) continuously introducing a plurality of yarn intermediate materials having a diameter of 1-3 mm into a heating unit;

(b) heating the intermediate materials to a temperature equal to or higher than the melting point of a thermoplastic resin contained in the intermediate materials to melt at least a portion of the thermoplastic resin on the surface of the intermediate material; and (c) passing at least two of the molten intermediate materials through a nozzle having an inlet end and an outlet end and wherein the nozzle has a diameter ratio of the inlet end to the diameter of the outlet end of 1.5-5 and a length ratio of the outlet end to the diameter of the outlet end of 2-10, to be combined together to form a rod shape to produce a continuous fiber reinforced thermoplastic resin composite material, wherein the composite material has a porosity of 1-10 vol % and satisfies Expression 1 below on the basis of the cross-section of the composite material:

$$0.2\ \text{mm}^{-1} \leq P/A \leq 5\ \text{mm}^{-1} \qquad \text{[Expression 1]}$$

wherein, in Expression 1, P and A are a cross-sectional circumference length and a cross-sectional area of the composite material, respectively.

9. The method for producing a continuous fiber reinforced thermoplastic resin composite material of claim 8, wherein the intermediate material has a continuous fiber content of 30-60 wt % and a thermoplastic resin content of 40-70 wt %.

10. The method for producing a continuous fiber reinforced thermoplastic resin composite material of claim 8, wherein the heating in step (b) is performed at a temperature higher than the melting point of the thermoplastic resin by 20-40° C.

11. The method for producing a continuous fiber reinforced thermoplastic resin composite material of claim 8, wherein the nozzle has a cross-sectional shape in which a bend is not formed, or one or more recess and protrusion are formed.

12. The method for producing a continuous fiber reinforced thermoplastic resin composite material of claim 8, wherein the rod discharged through the nozzle is rotated to form a spiral shape.

13. The method for producing a continuous fiber reinforced thermoplastic resin composite material of claim 8, wherein the nozzle has an outlet and wherein the nozzle is formed in multiple stages and has a reduced diameter toward the outlet.

* * * * *